Aug. 13, 1929.                E. ANDERSON                1,723,987
SAFETY FENDER FOR MOTOR VEHICLES
Original Filed Nov. 29, 1922   4 Sheets-Sheet 1
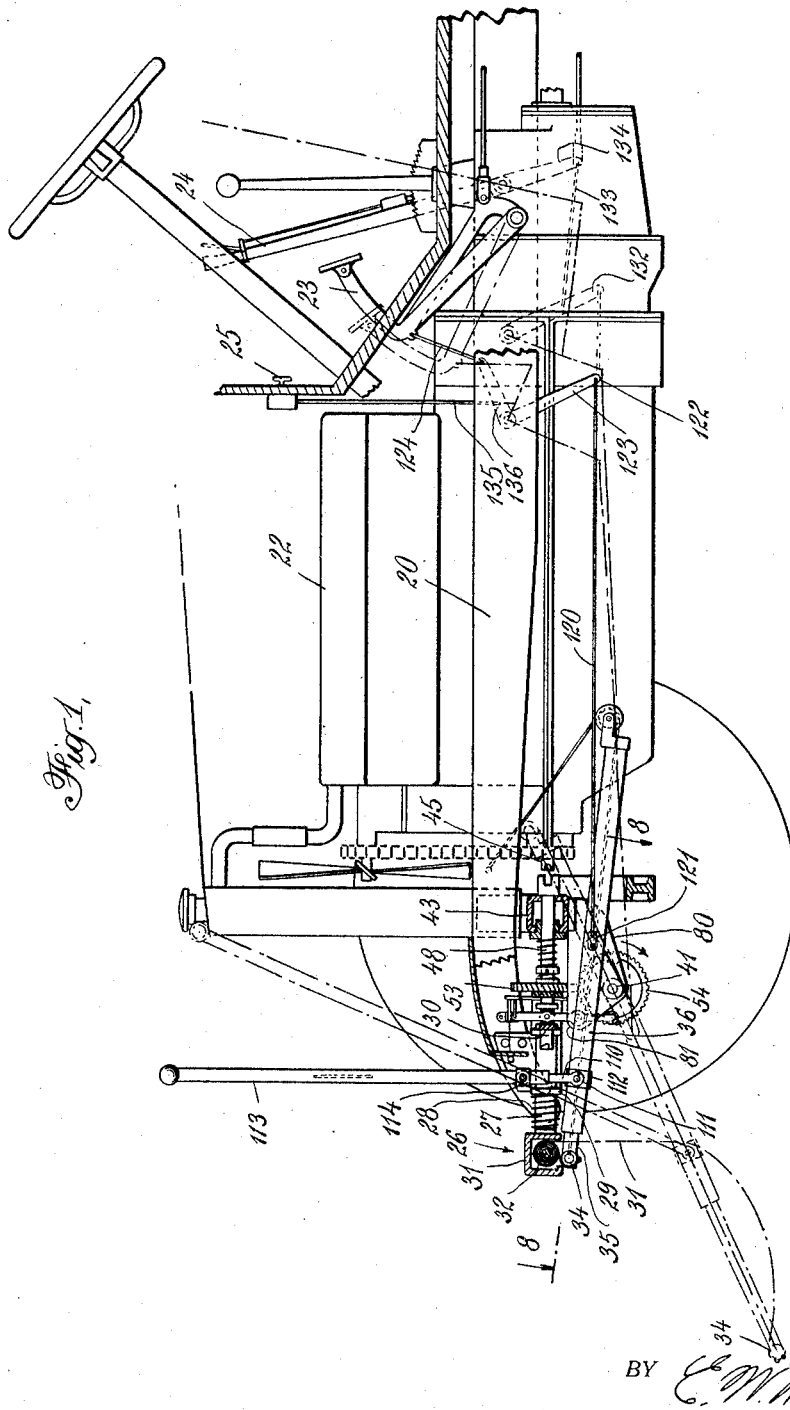
INVENTOR
*Emil Anderson*
BY *E. W. Marshall*
ATTORNEY Aug. 13, 1929.　　　　E. ANDERSON　　　　1,723,987
SAFETY FENDER FOR MOTOR VEHICLES
Original Filed Nov. 29, 1922　　4 Sheets-Sheet 2
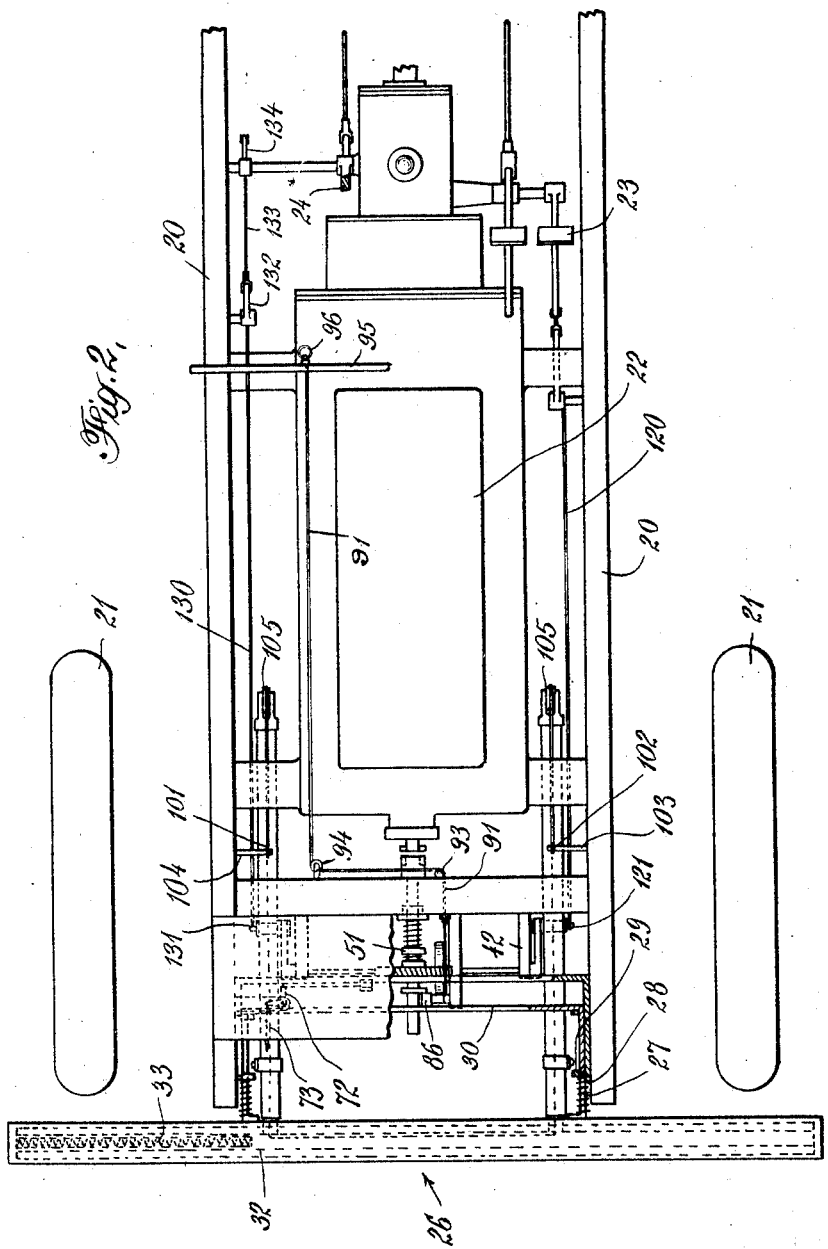
INVENTOR
Emil Anderson
BY
ATTORNEY

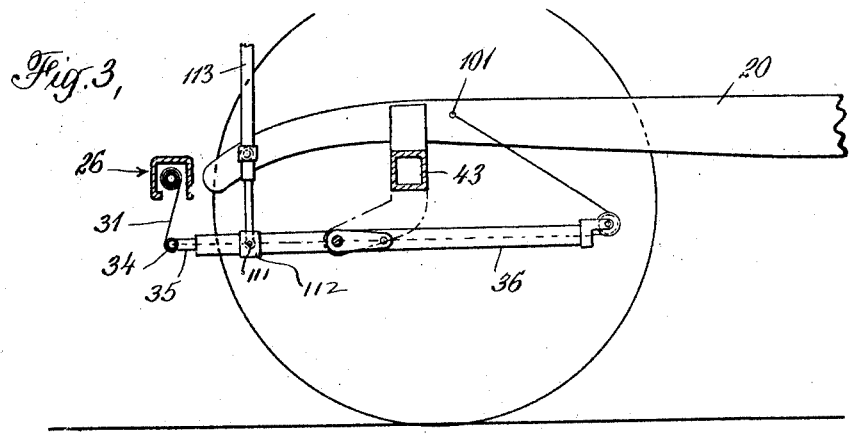
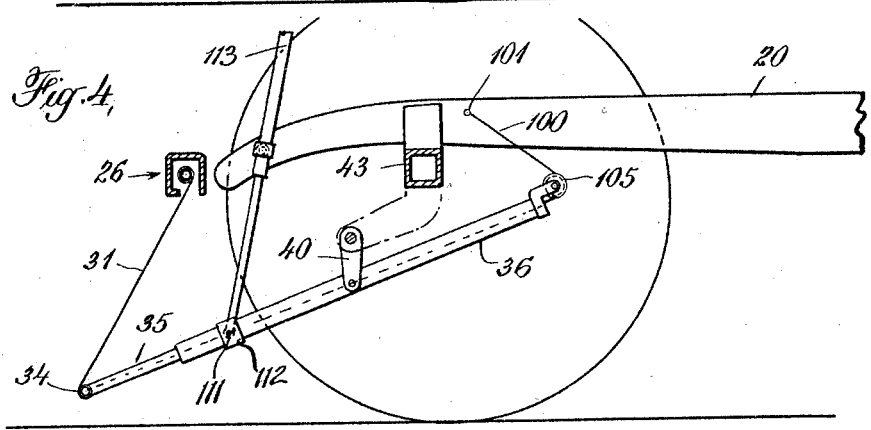
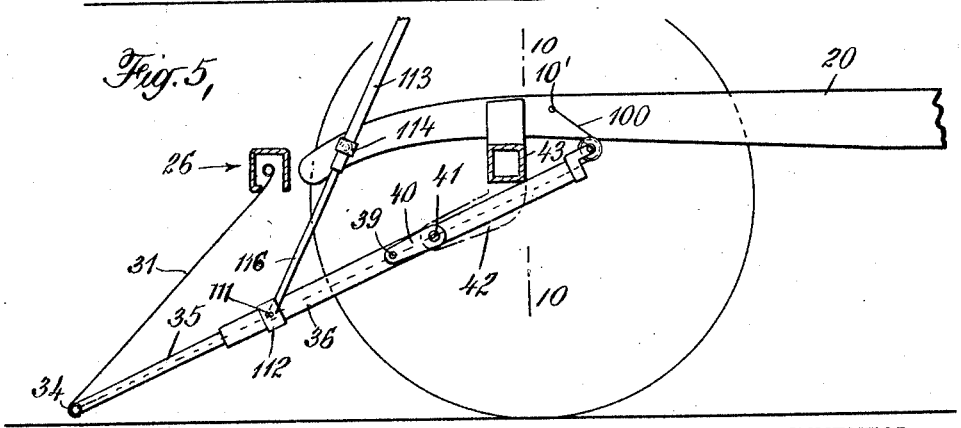

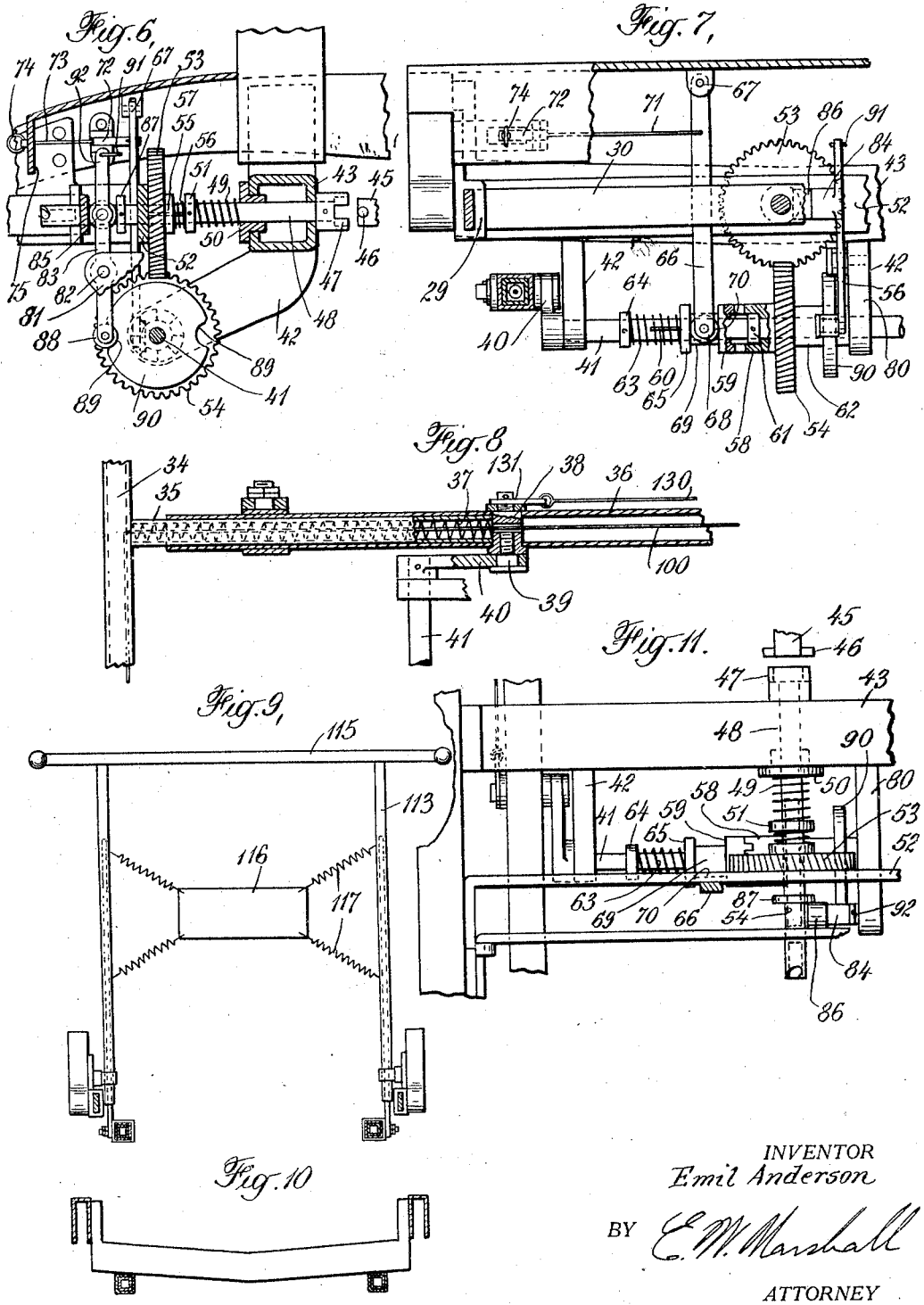

Patented Aug. 13, 1929.

1,723,987

UNITED STATES PATENT OFFICE.

EMIL ANDERSON, OF BROOKLYN, NEW YORK.

SAFETY FENDER FOR MOTOR VEHICLES.

Application filed November 29, 1922, Serial No. 603,925. Renewed January 7, 1929.

This invention relates to safety devices and particularly to safety fenders for motor vehicles.

As is well known, accidents involving motor vehicles are very common and because of their frequent occurrence and of the injuries to life and property, as well as to the vehicles, these accidents are now causing serious concern.

This invention has for its object to provide a safety fender for motor vehicles so constructed as to be automatically operated when engaged by any object in the path thereof.

Another object of the invention is to provide a fender movable in such a manner and through such a path as to support from beneath an object or person in the path thereof.

Another object of the invention is to provide a fender so constructed and arranged and so mounted on the vehicle as to be substantially concealed when not in use thereby not detracting from the appearance of the vehicle.

Another object of the invention is to provide a safety fender and positively actuating operating mechanism therefor adapted to positively and quickly move the fender to operative position.

Further objects of the invention will appear from the following specification taken in connection with the drawings, which form a part of this application, and in which Fig. 1 is a sectional elevation of the front end portion of a motor vehicle having mounted thereon a safety fender constructed in accordance with the invention.

Fig. 2 is a top plan view of the construction shown in Fig. 1.

Figs. 3, 4 and 5 are sectional elevations showing three different stages in the movement of the fender to operative position.

Fig. 6 is an enlarged detail sectional elevation showing the operating connections for the fender actuating shaft.

Fig. 7 is an elevational view partly in section taken at right angles to Fig. 6.

Fig. 8 is an enlarged sectional elevation of one end of the fender taken substantially on line 8—8 of Fig. 1.

Fig. 9 is a front elevation of the portion of the fender that extends above the vehicle frame.

Fig. 10 is a sectional elevation taken substantially on line 10—10 of Fig. 5, and Fig. 11 is a top plan view of the structure shown in Fig. 7.

The invention briefly described comprises a safety fender mounted on the front end of a motor vehicle frame and adapted to be lowered into operative position upon the engagement or collision of a bumper or a cross bar extending across the front of the vehicle with some object in the path of the vehicle. The fender comprises a curtain normally rolled upon a rod and held in retracted position by a spring and this curtain is unwound or moved to operative position by means of telescoping actuating members connected thereto. The telescoping members are positively moved from inoperative to operative position by power derived from the engine through intermediate shafting and gearing and one set of telescoping members is movable out of the other set of members by springs, this movement being permitted in a manner hereafter described. Means is provided for throwing out the clutch and applying the vehicle brakes when the fender is moved or lowered into operative position. Upon the actuation of the fender, the driving connections therefor will move the fender to operative position whereupon the drive will be automatically disconnected, the fender being retained in operative position until manually released. When the vehicle operator desires to raise the fender, the driving connections are again thrown in and the fender is raised. Further details of the invention will appear from the following description.

The vehicle illustrated in the drawings comprises a frame 20, wheels 21, a motor 22, clutch pedal 23, emergency brake lever 24 and ignition switch 25.

A bumper 26 is mounted at the front of the vehicle frame on bars 27, a spring 28 being interposed between the bumper and brackets 29 secured to the vehicle frame. The bars 27 are connected by a cross bar 30 which extends across the front of the frame and is movable longitudinally with reference to the frame when the bumper strikes an object or person in the path thereof.

In the particular embodiment of the invention illustrated, the fender consists mainly of a curtain 31 normally wound on a rod or roller 32 rotatably mounted in the bumper 26. A spring 33 engages the roller and the bumper and winds the curtain on the roller in the same manner as the ordinary window curtain.

The free end of the curtain is connected to a rod 34 carried at the front ends of members 35, these members telescoping within tubular members 36. Springs 37 are mounted in the members 35 and at their outer ends engage the rod 34 and at their inner ends engage studs 38 carried by the tubular members 36.

In order to prevent injury to a person in the path of the vehicle, means is provided for giving the fender curtain and the parts connected thereto a downward swinging movement or a movement downwardly and forwardly with respect to the vehicle. To accomplish the swinging movement, the tubular members 36 are pivotally connected by pivot pins 39 carried by the studs 38 to crank arms 40 carried by a shaft 41 supported in brackets 42 secured to a cross frame member 43.

The shaft 41 is adapted to be positively actuated by power derived from the motor shaft in the following manner.

The front end of the motor shaft 45 carries a cross pin 46 adapted to be engaged by a clutch member 47 carried by a shaft 48 disposed in alinement with the shaft 45 and normally out of engagement therewith. The shaft 48 is slidably mounted in the cross frame member 43 and is normally retained in a position spaced from the shaft 45 by a spring 49 interposed between a bearing member 50 carried by the cross frame member 43 and a collar 51 pinned to the shaft 48. The shaft 48 is also slidably supported at its front end in a cross frame member 52 connected at its ends to the side frame members of the vehicle and the front end of the shaft extends through the member 30 which, as above stated, is movable with and may be formed integral with the bars 27. As shown in Fig. 2, the brackets 29 in which the bars 27 are slidable may be carried by or formed integral with the cross frame member 52.

The drive from the shaft 48 to the shaft 41 is transmitted through a pair of spiral gears 53 and 54 carried respectively by the shafts 48 and 41.

The gear 53 is splined as shown at 55 to the shaft 48 and is retained against movement with the shaft when the shaft is moved longitudinally by means of a spring 56 interposed between the collar 51 on the shaft and the hub 57 of the gear. The gear 53 abuts against the cross frame member 52 and spring 56 presses the gear against this member and retains the gear in this position in which it meshes with the gear 54 regardless of the position of the shaft 48.

In order to permit the rotation of the shaft 48 by means of a crank handle to start the motor without operating the safety fender, the gear 54 is connected to the shaft 41 through a jaw clutch comprising members 58 and 59, the member 58 being connected to the gear 54 or formed integral therewith and the member 59 being splined as shown at 60 to the shaft 41. A collar 61 is pinned to the shaft and is disposed within the clutch member 58 in order to properly position the gear 54 on the shaft. The gear 54 also has a sleeve or hub 62 formed on or secured thereto and extending therefrom in a direction opposite to the clutch member 58. A spring 63 is mounted on the shaft 41 and is interposed between a collar 64 pinned to the shaft and one end 65 of the clutch member 59 and this spring tends to retain the clutch members 58 and 59 in driving engagement with each other.

In order to permit rotation of the shaft 48 and gears 53 and 54 without causing the shaft 41 to rotate, a lever 66 is pivoted at 67 to the vehicle frame and has its lower end 68 disposed in a groove 69 formed in the clutch member 59. A roller 70 may be mounted at the lower end 68 of the lever 66, if desired.

The lever 66 is actuated to release the clutch members by means of a cable 71 connected at one end to the lever and at its opposite end to a bell crank lever 72 pivoted on the frame and the opposite end of the bell crank lever is connected by a cable or rod 73 to a ring 74, this cable or rod 73 extending through the front end 75 of the frame and the ring 74 being disposed at the front of the frame in a position to be engaged by the operator.

It will thus be seen that when the operator desires to crank the motor, the crank handle is connected to the front end of the shaft 48 in the usual manner and the shaft is pushed inwardly to a position in which the clutch member 47 will engage the cross pin 46 carried by the front end of the motor shaft 45. At the same time the operator will pull forwardly on the ring 74, thereby moving the lever 66 to the left (see Fig. 7). This movement of the lever will release the clutch members 58 and 59, thereby disconnecting the gear 54 from the shaft 41 and permitting free rotation of the gear without effecting rotation of the shaft 41.

The automatic actuation of the shafts 48 and 41 and operation of the fender is effected in the following manner. The shaft 41 is supported intermediate its ends by a bracket 80 having an extension 81 on which is pivoted at 82 a lever 83. This lever has formed thereon intermediate its ends and above the pivot 82 a laterally extending lug 84 on which is pivoted at 85 a roller 86. As clearly illustrated in Fig. 2, the roller 86 is positioned at the rear of and in engagement with the cross bar 30 and is also positioned immediately in front of a collar 87 pinned to the shaft 48. At its lower end the lever 83 carries a roller 88 adapted to seat in one or the other of a pair of diametrically opposite depressions 89 formed in a cam 90 secured or formed on the sleeve or hub 62 of the gear 54.

Means is provided for manually releasing the roller 88 of the lever 83 from the depressions 89 and this means consists of a cable 91 secured to the upper end 92 of the lever and extending around sheaves 93 and 94 and rearwardly through the dash or instrument board 95, a ring 96 being secured to the rear end of the cable 91. The operator by pulling on the cable 91 will swing the lever 83 in a clockwise direction (see Fig. 6), thereby releasing the roller 88 from the depression 89 in which it is seated and permitting rotation of the cam 90 and gear 54.

The forward movement of the members 35 in the tubular members 36 is controlled by means of a cable 100 secured at its opposite ends 101 and 102 to studs 103 and 104 mounted on the side frame members of the vehicle. The cable 100 extends around sheaves 105 mounted on the rear ends of the members 36 and through the members 36 and 37 as shown in Figs. 2, 3, 4, 5 and 8 and also through the rod 34 secured to the members 35. If desired, however, a separate cable could be connected to the frame and to the front ends of the rods 35 instead of making the cable continuous and extending it through the rod 34.

Fig. 3 illustrates somewhat diagrammatically the raised or normal position of the fender and from this view it will be seen that when the rods 35 are retracted a considerable length of the cable will extend between the studs 101 and 102 and the sheaves 105 carried by the members 36. When, however, the members 36 are swung downwardly by the crank arms 40, the rear ends of the members 36 will approach more closely the fixed ends 101 and 102 of the cable, thereby shortening the lengths of cable between the sheaves 105 and the studs 101 and 102. In Fig. 5 it will be noted that the rear ends of the members 36 have approached still more closely the points of connection of the cable to the frame, thereby still further shortening the length of cable between the points of attachment of the cable to the frame and the sheave 105. This shortening of the length of cable beyond the ends of the members 36 will permit the forward movement of the rods 35 since the cable intermediate the end portions is lengthened. Therefore, as the members 36 are swung to their lower position in which it will be noted that these members engage the under surface of the cross frame member 43, the rods 35 are permitted to slide longitudinally in the members 36 to the position shown in Fig. 5 in which the fender curtain has been lowered to its operative position. As the fender is raised, the crank arm 40 will continue its rotation through another half revolution, thereby returning the parts to the position shown in Fig. 3.

In order to form a support for an object above the bumper and to prevent an object or person from striking the radiator, an additional frame is secured to the members 36 and is operable when the fender is lowered. This frame comprises a pair of rods or links 110 pivoted at 111 to sleeves 112 carried by the members 36 and the rods 110 telescope in the tubular members 113 swiveled as shown at 114 to the side frame members of the vehicle. The members 113 are connected at their upper ends by a cross bar 115 and intermediate the ends of the members 113 a plate 116 is connected by springs 117 thereto. This plate 116 may, if desired, be the number plate of the vehicle.

In Fig. 1 the normal position of the supplemental supporting frame is shown in full lines and the position of this means when the fender has been lowered is shown in dot and dash lines.

In addition to providing means for automatically lowering the fender when the bumper or cross bar at the front end of the vehicle collides with an object or person, means has been provided for throwing out the driving clutch and for applying the brakes to the vehicle. The clutch pedal 23 is operated by means of a cable 120 connected at its front end 121 to the end of one of the studs 38 mounted in one of the tubular members 36 and at its rear end at 122 to a bell crank lever 123 which in turn is connected by a link 124 to the clutch pedal 23. The emergency brake lever 24 is operated by a cable connection 130 secured at 131 to the stud 38 carried by the other tubular member 36 and secured at its rear end to a lever arm 132 which in turn is connected by a link 133 to the lower end 134 of the brake lever 24.

If desired, the ignition may be cut off from the motor when the fender is lowered and in Fig. 1 there is shown a cable or link 135 connected at one end as shown at 136 to the bell crank lever 123 and at its opposite end to the ignition switch 25.

The safety fender operates in the following manner. When the bumper 26 strikes an object or person in the path thereof, the bumper will be pushed rearwardly against the tension of the springs 28 and will carry with it the cross bar 30. As this bar is forced rearwardly, the lever 83 will be swung on its pivot 82 by reason of the engagement of the roller 86 carried by the lever with the bar 30. When the lever 83 is swung on its pivot two results are accomplished, namely, the roller 86 by reason of its engagement with the collar 87 on the shaft 48 will force the shaft rearwardly causing the clutch member 47 on the shaft to engage the front end of the motor shaft 45. Also as the upper end of the lever is swung rearwardly causing the operative engagement between the shafts 45 and 48, the lower end of the lever will be swung forwardly releasing the roller 88 carried thereby from one of the depressions 89 in the cam 90 and permitting rotation of the cam 90 and gear 54 connected thereto. The rotation of the shaft 48 by the shaft 45 will in turn rotate the shaft 41 through the gears 53 and 54 and clutch connections 58 and 59 between the gear 54 and the shaft 41. As the shaft 41 is rotated, the crank arms 40 will swing from the position shown in Fig. 3 through substantially 180 degrees to the position shown in Fig. 5, thereby lowering the tubular members 36 and permitting longitudinal movement of the members 35 in the members 36 in the manner hereinbefore described. The operation just described will, of course, unwind the curtain 31 from the curtain roller 34 as shown in Fig. 5.

At the same time the movement of the tubular members 36 will swing the fender frame formed by the members 113 and the member 114 from the full line position shown in Fig. 1 to the dot and dash line position.

Furthermore, as the tubular members 36 are swung to their lower position a pull will be exerted on the cables 120 and 130, thereby throwing out the vehicle clutch, applying the brakes and cutting off the ignition in the manner hereinbefore described.

After the fender has been swung downwardly to operative position, the cam 90 will have rotated through 180 degrees and the roller 88 will move into the depression 89 opposite the depression in which it was initially seated. As the roller 88 seats in the depression, the lever 83 will swing about the pivot 82 to the position shown in Fig. 6, thereby disengaging the driving connection between the shafts 48 and 45. In order to raise the fender to inoperative position, the vehicle driver will pull on the cable 91, thereby swinging the lever 83 again in a clockwise direction, releasing the roller 88 from the depression 89 in which it is seated and permitting the rotation of the shaft 41 through one half of one revolution to the initial position shown in Fig. 3.

When the vehicle driver desires to crank the engine by hand, the crank handle is placed on the front end of the shaft 48 and is pushed rearwardly causing the shaft 48 to be operatively connected to the shaft 45. At the same time the driver will pull on the cable 73, thereby swinging the lever 66 (Fig. 7) in a clockwise direction and disengaging the clutch members 58 and 59. Manual rotation of the shaft 48 will thereafter be permitted without operating the safety fender mechanism since the gear 54 will be rotated freely on the shaft 41 by the gear 53.

Although one specific embodiment of the invention has been particularly shown and described, it will be understood that the invention is capable of modification and that changes in the construction and arrangement of the various cooperating parts may be made without departing from the spirit or scope of the invention as expressed in the following claims.

What I claim is:

1. In combination, a motor vehicle having a motor thereon, a shaft driven thereby, a safety fender mounted on said vehicle, connections between said fender and said shaft whereby said fender may be moved to operative position by motive power derived from said shaft and motor, and means for automatically disconnecting said connections when said fender has been moved to operative position.

2. In combination, a motor vehicle having a motor thereon, a shaft driven thereby, a safety fender mounted on said vehicle, connections between said fender and said shaft whereby said fender may be moved to operative position by motive power derived from said shaft and motor, a transverse member secured to and extending across the front of the vehicle and means controlled by said member for rendering said connections operative.

3. In combination, a motor vehicle having a motor thereon, a shaft driven thereby, a safety fender mounted on said vehicle, connections between said fender and said shaft whereby said fender may be moved to operative position by motive power derived from said shaft and motor, a transverse member secured to and extending across the front of the vehicle, means controlled by said member for rendering said connections operative, and means automatically operable when said fender has been actuated for rendering the connections between the fender and shaft inoperative.

4. In combination, a motor vehicle having a motor, a shaft driven thereby, a safety fender mounted on the vehicle, and mechanism for moving said fender to operative and inoperative position including a clutch for connecting said mechanism to said shaft.

5. In combination, a motor vehicle having a motor, a shaft driven thereby, a safety fender mounted on the vehicle, mechanism for moving said fender to operative and inoperative position including a clutch for connecting said mechanism to said shaft, and means including a bumper for actuating said clutch to connect the shaft to said fender operating mechanism.

6. In combination, a motor vehicle having a motor, a shaft driven thereby, a safety fender mounted on the vehicle, mechanism for moving said fender to operative and inoperative position including a clutch for connecting said mechanism to said shaft, means for actuating said clutch to connect the shaft to said fender operating mechanism, and automatically operable means for releasing said clutch when the fender has been moved to operative position.

7. In combination, a motor vehicle having a motor, a shaft driven thereby, a safety fender mounted on the vehicle, mechanism for moving said fender to operative and inoperative position including a clutch for connecting said mechanism to said shaft, and means including a member extending transversely across the front of the vehicle for actuating said clutch to connect the shaft to said fender operating mechanism.

8. In combination, a motor vehicle having a motor, a shaft driven thereby, a safety fender mounted on the vehicle, mechanism for moving said fender to operative and inoperative position including a clutch for connecting said mechanism to said shaft, and means including a bumper extending transversely across the front of the vehicle for actuating said clutch to connect the shaft to said fender operating mechanism.

9. In combination, a motor vehicle having a motor, a shaft driven thereby, a safety fender, including a curtain adapted to be lowered to a position near the ground, mounted on the vehicle, and mechanism for moving said fender to operative and inoperative position including a clutch for connecting said mechanism to said shaft.

10. In combination, a power driven shaft, a shaft adapted to be driven thereby, crank arms on said second shaft, members mounted on said crank arms, rods slidable in said members, a fender carried by said rods and operative driving connections between said shafts.

11. In combination, a power driven shaft, a shaft adapted to be driven thereby, crank arms on said second shaft, members mounted on said crank arms, rods slidable in said members, resilient means carried by said members and adapted to move said rods forwardly in said members, a fender carried by said rods and operative driving connections between said shafts.

12. In combination, a power driven shaft, a shaft adapted to be driven thereby, crank arms on said second shaft, members mounted on said crank arms, rods slidable in said members, a cross rod connected to the front ends of said rods, and a fender curtain mounted on the front of the vehicle frame and connected at its free end to said rod.

13. In combination, a motor vehicle having a motor driven shaft, a bumper mounted on the front end of the vehicle, a roller mounted in said bumper, a fender curtain secured at one end to said roller, and means operable from said shaft and connected to the free end of said curtain for unwinding said curtain and moving the fender curtain downwardly.

14. In combination, a motor vehicle having a motor driven shaft, a bumper mounted on the front end of the vehicle, a roller mounted in said bumper, a fender curtain secured at one end to said roller, means operable from said shaft and connected to the free end of said curtain for unwinding said curtain and moving the fender curtain downwardly, and means connected to said bumper for connecting said curtain unwinding means to said shaft.

15. In combination, a motor vehicle having a motor, a motor shaft, a safety fender, operative driving connections between said fender and said shaft and including a driving clutch, a member carried at the front of the vehicle frame in a position to engage an obstruction in the path of the vehicle and adapted to actuate said driving clutch and connect said fender driving connections to said shaft.

16. In combination, a motor vehicle having a motor, a motor shaft, a clutch between said shaft and the vehicle wheels and a brake, a safety fender, operative driving connections between said fender and said shaft and including a driving clutch, a member carried at the front of the vehicle frame in a position to engage an obstruction in the path of the vehicle and adapted to actuate said driving clutch and connect said fender driving connections to said shaft, and operative connections between said fender and said first-named clutch and between said fender and said brake.

In witness whereof, I have hereunto set my hand this 16th day of November, 1922.

EMIL ANDERSON.